(No Model.)

J. STUNDEN.
CLOTHES DRIER.

No. 389,336. Patented Sept. 11, 1888.

Witnesses:
John Grist
C. G. Pennock

Inventor
J. Stunden
By Henry Grist
Att'y.

N. PETERS, Photo-Lithographer, Washington, D. C.

United States Patent Office.

JESSE STUNDEN, OF GANANOQUE, ONTARIO, CANADA.

CLOTHES-DRIER.

SPECIFICATION forming part of Letters Patent No. 389,336, dated September 11, 1888.

Application filed September 17, 1887. Renewed June 9, 1888. Serial No. 276,576. (No model.)

*To all whom it may concern:*

Be it known that I, JESSE STUNDEN, of Gananoque, in the Province of Ontario, in the Dominion of Canada, have invented certain new and useful Improvements in Clothes-Driers; and I do hereby declare that the following is a full, clear, and exact description of the same, reference being had to the accompanying drawings, in which—

Figure 1:
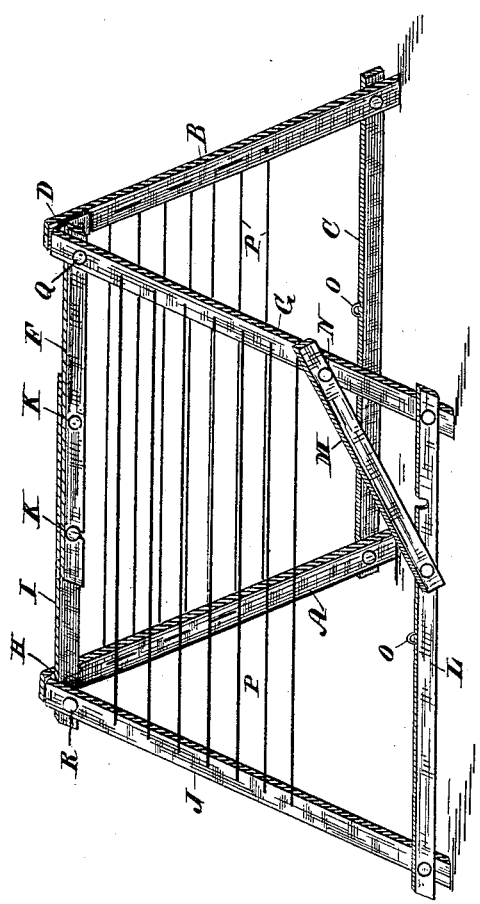
Figure 2:
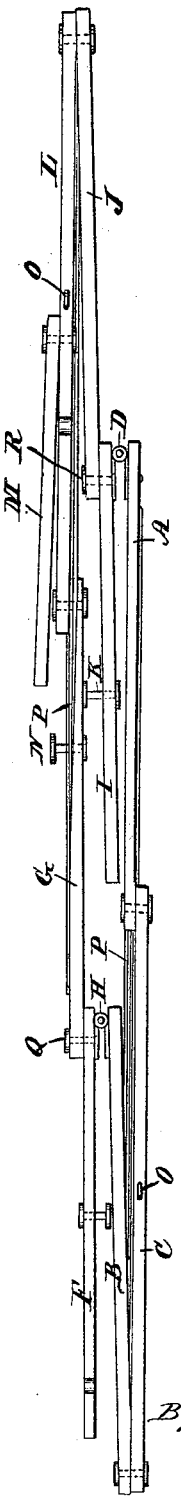

Figure 1 is a perspective view of my improved clothes-drier extended as when in use, and Fig. 2 is a plan of the same collapsed.

My invention has for its object to construct a clothes-drier which can be used in a house and carried into the open air without disturbing the clothes pinned on the line.

My invention consists of two rectangular frames formed of bars pivoted at their intersections and hinged together at top, so as to spread apart at the bottom, and provided with lines on which to hang the clothes. The frames close together laterally for removal from place to place when the clothes are on the line and collapse diagonally when not in use.

A B are the side bars pivoted to a connecting-bar, C, near their lower ends, and form one frame of the drier. The side bar, B, at the top is secured to one member of the hinge D, and the other member of the hinge is secured by a pivot, Q, at the intersection of bars F G, and the side bar, A, at top is secured to one member of a hinge, H, and the other member of the hinge is secured by a pivot, R, at the intersection of bars I J. The bars F I overlap, and are connected by a notch in one bar engaging with a stud, K, projecting from the other bar. The side bars, J G, at their lower ends are pivoted to bar L near its ends and at top to bars F I. Bar L is provided with a pivoted brace, M, which engages a stud, N, on bar G, diagonally to keep the frames from collapsing when in use. Lines P, on which to hang the clothes, are stretched across from bar A to bar B and from bar G to bar J.

O is a staple in bars C L through which to insert a peg to fasten the frames to the ground when extended at an angle apart to keep the drier from being blown down.

The collapsing of the frames without removing the lines is effected by disconnecting brace M from stud N and separating the bars F I. The frames are then pressed diagonally at opposite corners to bring all the bars of both frames together.

The clothes are pinned on the lines, and need not be removed when the drier is being carried from a room into a yard to dry, as the hinges allow the frames to close together and retain the clothes intermediately.

I claim as my invention—

A clothes-drier consisting of bars A B, pivoted at lower end to bar C and at top hinged to bars F I, connected together by notches and studs K, side bars, G J, pivoted to the outer ends of bars F I and to bottom bar, L, provided with a pivoted brace, M, notched to engage stud N on bar G, and lines P, stretched across from bar A to bar B and from bar G to bar J, as set forth.

JESSE STUNDEN.

Witnesses:
W. K. L. SMELLIE,
H. H. CAMPBELL.